A. R. BLEWETT.
TRACTOR BELT.
APPLICATION FILED JUNE 23, 1919.

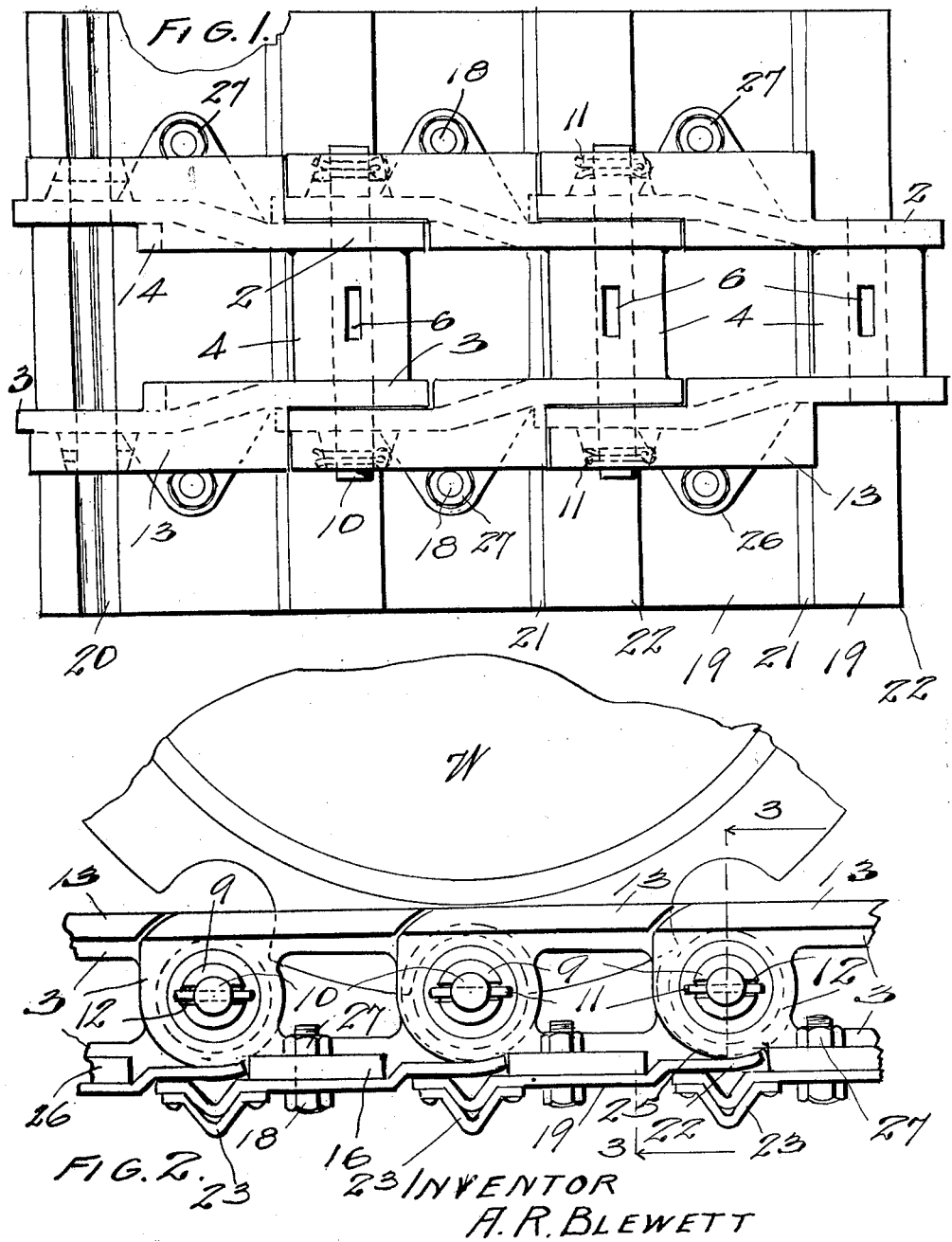

1,343,958.

Patented June 22, 1920.
2 SHEETS—SHEET 2.

INVENTOR
A. R. BLEWETT

Herbert E. Smith
Attorney

UNITED STATES PATENT OFFICE.

ARTHUR R. BLEWETT, OF TACOMA, WASHINGTON, ASSIGNOR TO BLEWETT TRACTOR COMPANY, OF TACOMA, WASHINGTON.

TRACTOR-BELT.

1,343,958. Specification of Letters Patent. Patented June 22, 1920.

Application filed June 23, 1919. Serial No. 306,070.

*To all whom it may concern:*

Be it known that I, ARTHUR R. BLEWETT, a citizen of the United States, residing at Tacoma, in the county of Pierce and State of Washington, have invented certain new and useful Improvements in Tractor-Belts, of which the following is a specification.

The present invention relates to an improved tractor belt designed particularly for use in connection with the caterpillar type of tractors or tractor machines, and for the purpose of providing a traction belt with the cleats or grousers on the lower side of the belt, in the best and most efficient arrangement and relation to the belt for attaining the desired tractive power, as the machine moves over the ground. In the construction of the traction belt, to prevent the belt from buckling when the belt passes beneath the sprocket wheels and receives the load, I place the grousers or transverse cleats of the belt directly beneath the link joints, and arrange the adjacent parts of the belt so that it will lie perfectly flat on the bearing surface when receiving the load.

The invention also contemplates certain improved combinations and arrangements of parts involving the assembling of the links of the belt, their disassembling, and certain other details as will be hereinafter set forth and claimed.

In the accompanying drawings I have illustrated one complete example of the physical embodiment of my invention, constructed and arranged according to the best mode so far devised for the practical application of the principles of my invention, and which embodiment has proven highly satisfactory in actual use.

Figure 1 is a plan view of a portion of the traction belt, showing the upper side of the belt as its lower flight rests upon the ground.

Fig. 2 is a side view of a portion of the lower or working flight of the belt, with a sprocket driving wheel illustrated in operative relation thereto.

Figure 3:
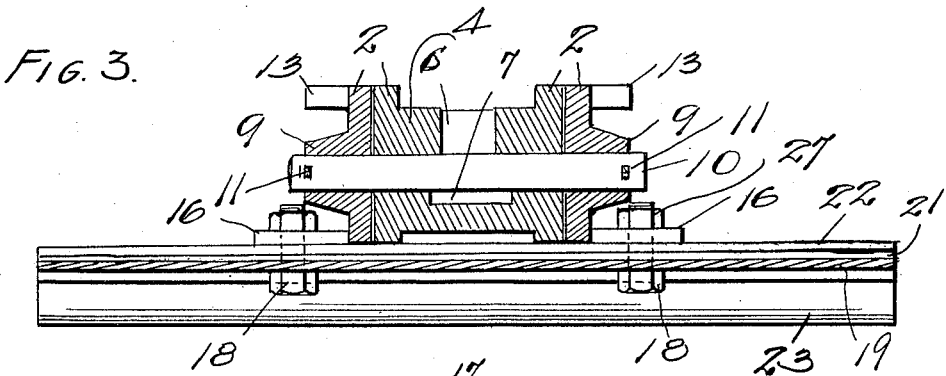
Fig. 3 is a transverse, sectional view taken at line 3—3 of Fig. 2, at two different planes, for convenience of illustration.
Figure 4:
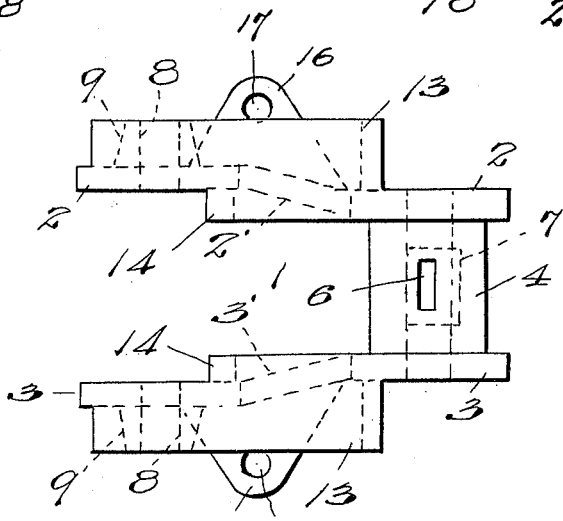
Fig. 4 is a detail plan view of one of the links.
Figures 5, 6:
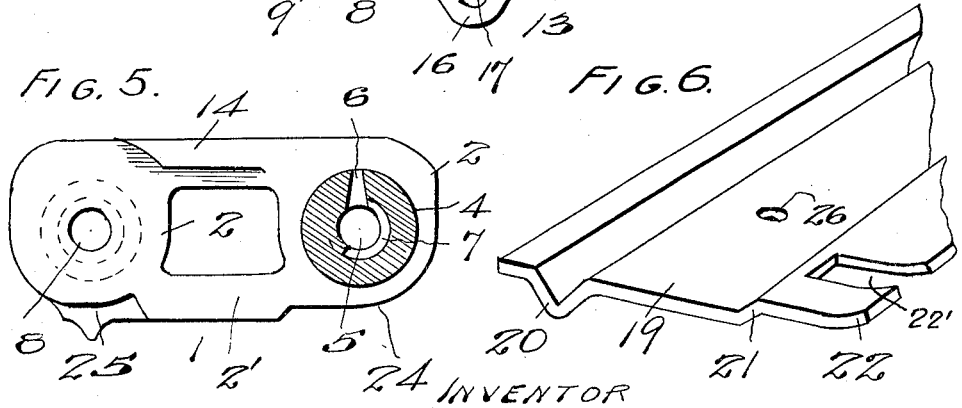
Fig. 5 is a longitudinal, central sectional view of one of the links.
Fig. 6 is a perspective view of part of one of the tread plates.

In the preferred form of the invention as illustrated in the drawings the track link is designated as a whole by the numeral 1, and is an integral, cast iron or cast steel member of proper size, and comprising a pair of vertical, offset, and spaced webs 2 and 3 extending from front to the rear of the link and offset as indicated at 2' and 3' in dotted lines Fig. 4 so that the front ends of the webs 2 and 3 will fit within the rear ends 2 and 3 of the link, and the members of the belt or sprocket chain formed thereby, articulate in the proper manner.

At the front of each link an integral sleeve 4 connects the webs with which sleeve the driving sprocket wheel W is designed to co-act as usual, and the bore of the sleeve is designated 5 in each instance, there being an open radial slot 6 extending from the bore to the periphery of the bearing sleeve, and a recess or annular chamber 7 is provided in the bearing sleeve for retaining a lubricant. At the rear end of the links each is fashioned with a pair of alined transverse openings 8, and integral bosses 9 project laterally from the outer faces of the webs to form bearings for the ends of the link pins 10 which are passed through the front opening 5 of one link and the rear openings 8 of the preceding link or the link in advance thereof.

The link pins are retained in place by the utilization of cotter pins 11 at their ends, and preferably the outer faces of the bosses 9 are provided with horizontal grooves 12 arranged diametrically thereof forming recesses for the cotter pins 11 within the bosses, in order to prevent displacement of the cotter pins.

Preferably the links are fashioned with integral, lateral guard flanges 13, 13 at the outer sides of their webs, and lateral guard flanges 14 on the inner sides of their webs, to act as shields for the belt, and also to reinforce or strengthen the links and consequently the belt as a whole, and to form a bearing surface for the tread of the flanged spur wheel or sprocket wheel W when the belt is bearing the load of the tractor as in Fig. 2.

Each link is provided with a pair of outwardly projecting lateral perforated ears 16, the opening 17 therein being adapted to receive an attaching bolt 18, passed upwardly through the tread plate 19 and through the perforated ear as shown. There is a tread plate 19 for each link, and each plate is fashioned with a downwardly projecting, transverse, V-shaped, integral rib 20, and an offset portion 21, terminating at the front of the plate in an upwardly curved edge 22. Preferably a V-shaped grouser or cleat 23 is attached to the traction side of the tread plate over the rib, and extending the width of the rib on the tread plate, to provide for wear, and it will readily be seen that this cleat may be replaced by a new one as soon as it is worn, thus saving and making more durable, the tread plates themselves.

The tread plates are of the required width and proper length to form parts of the links to which each is attached, and the front and rear parts 24 and 25, respectively of the webs of the links are rounded so that the forward end of the tread plate at 22 may overlap the rear end of the advanced plate and the forward end of the plate retain its close proximity to the rounded webs as the linked belt passes around the sprocket wheel W. The forward or overlapping end 22 of the tread plate is provided with open slots 22' to accommodate the side rails or webs 2 and 3 of the preceding link in order that the load may be borne directly on the rib 20 and cleat 23 located in a vertical line beneath the link joint, the lug 25 on the webs fitting in the upper portion or recess of the integral V-shape rib 20 of the plate. Each tread plate is provided with a pair of openings 26 for the passage of the attaching bolts 18, and these bolts are provided with securing nuts 27 turned against the ears 16 of the links to firmly attach the tread plates to their links.

In Fig. 2 it will be seen that the grousers or cleats on the shoes or tread plates of the belt, are arranged to come directly beneath the link pins 10 of the belt or chain, and the load of the tractor or machine is supported directly through the cleats, the forward end 22 of the tread plate, the webs of the plates and the horizontal guards or flanges of the webs, imposed by the wheel W. The grooves or recesses in the ends of the bearing bosses 9 permit facile manipulation of the cotter pins, and it is evident that the belt may be disconnected by the removal of a pair of the cotter pins and the withdrawal of one of the link pins 10. Thus, in lubricating the belt, the cotter pins and link pin may be withdrawn as described, the belt laid out flat its full length, and then the tractor machine run off the belt, so that the lubricant may be supplied to the chamber or recess 7 of the bearing sleeve, and then the slot 6 may be filled with waste as usual to keep out dirt, etc.

The width of the tread plates 19 is to be determined to suit different conditions, but in all cases the traction cleats or grousers of the tread plates come directly beneath the link pins of the belt, and at this point, as will be readily apparent, the greatest or maximum strength of the belt is present to receive the load. Between the front bearing sleeve and the rear bearing bosses the webs may be formed with openings to economize in material, as the guard flanges, and perforated ears for the tread plates provide sufficient strength of material for the links.

From the above description taken in connection with the drawings it is evident that I have provided a traction belt of this character which is strong and durable, facile in its operation, and withal simple in construction and comparatively inexpensive in production, and a comparatively perfect device for performing its required functions.

Having thus described my invention, what I claim as new and desire to secure by Letters Patent is—

1. The combination in a tractor belt with a link having spaced vertical webs and lateral perforated ears, of a tread plate secured to said ears having a V-shape transverse rib directly beneath the hinge of the link and depending lugs on the lower edges of said webs engaged in the recessed portion of the rib, the front end of said plate being upwardly offset and formed with spaced open slots to overlap a preceding plate and permit the webs of the preceding link to bear directly on its plate.

2. The combination in a tractor belt with a link having spaced webs and lateral perforated ears, of a tread plate secured to the ears having a V-shape transverse rib directly beneath the hinge of the link and depending lugs on said webs engaged in said rib, side upper flanges on said webs forming bearing surfaces in the belt, the front end of said plate being upwardly offset to overlap a preceding plate, and means on the offset portion of the plate to accommodate the webs of a preceding link for the purpose described.

3. The combination in a tractor belt with a link having spaced webs each formed with a lower depending lug, and upper side flanges forming bearing surfaces in the belt, of a tread plate secured to the webs and provided with a V-shape transverse rib directly below the link joint to receive said lugs, the front end of said plate being upwardly off-set and formed with spaced open end slots to overlap the preceding link-plate and permit the webs of the preceding link to bear directly on its plate for the purpose described.

In testimony whereof I affix my signature.

ARTHUR R. BLEWETT.